(12) United States Patent  
Dai

(10) Patent No.: US 7,974,089 B2  
(45) Date of Patent: Jul. 5, 2011

(54) FIXING MECHANISM FOR STORAGE DEVICE

(75) Inventor: Bin Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 8 days.

(21) Appl. No.: 12/541,303

(22) Filed: Aug. 14, 2009

(65) Prior Publication Data  
US 2010/0238624 A1 Sep. 23, 2010

(30) Foreign Application Priority Data  
Mar. 21, 2009 (CN) .......................... 2009 1 0301004

(51) Int. Cl.  
H05K 5/00 (2006.01)  
H05K 7/00 (2006.01)  
H01R 13/66 (2006.01)  
H01R 15/62 (2006.01)

(52) U.S. Cl. ......... 361/679.37; 361/379.33; 361/679.34; 361/679.35; 361/679.36; 361/679.38; 312/332.1; 312/333; 439/327; 439/328; 439/151

(58) Field of Classification Search .. 361/679.31–679.4, 361/679.55–679.6, 724–727; 312/223.1, 312/223.2; 439/60, 151–160, 327, 328, 331; 165/104.33  
See application file for complete search history.

(56) References Cited

U.S. PATENT DOCUMENTS

| 7,575,453 | B2 * | 8/2009 | Lee et al. ................... 439/159 |
| 7,808,778 | B2 * | 10/2010 | Hsu ........................... 361/679.38 |
| 2004/0166712 | A1 * | 8/2004 | Chou ........................... 439/157 |
| 2006/0187630 | A1 * | 8/2006 | Knappich et al. ............. 361/684 |
| 2008/0263846 | A1 * | 10/2008 | Chen ............................... 29/410 |

* cited by examiner

Primary Examiner — Robert J Hoffberg  
Assistant Examiner — Jerry Wu  
(74) Attorney, Agent, or Firm — Clifford O. Chi

(57) ABSTRACT

A fixing mechanism for fixing a storage device to an electronic device. The electronic device includes a bracket. The fixing mechanism includes two pairs of latching members extending upward from the bracket, a limiting member having a pair of resilient limiting portions, and two pairs of fixing members fixing the limiting member to the storage device. The two pairs of fixing members engage the corresponding latching members. The pair of the resilient limiting portions resists the corresponding latching members to secure the two pairs of the fixing members. The storage device is detached from the bracket depending on the resilient deformation of the resilient limiting portions.

18 Claims, 4 Drawing Sheets

FIXING MECHANISM FOR STORAGE DEVICE

BACKGROUND

1. Technical Field

The present disclosure relates to fixing mechanisms, and particularly, to a fixing mechanism for a storage device.

2. Description of the Related Art

Electronic devices, such as a typical desktop computer and a server, usually include storage devices, such as hard disk drives, compact disk read-only memory (CD-ROM) drives, digital video disc (DVD) drives, floppy disk drives, and so on. These electronic devices are typically added to increase the functionality of the electronic device as desired.

A typical fixing mechanism mounts a storage device to an electronic device. The electronic device, such as a host computer, includes a case having a base and a sidewall. The fixing mechanism includes a storage device holder, a fixing bracket, and a plurality of screws. The bracket is perpendicularly fixed to the base of the housing, and is separate from the sidewall. The storage device holder includes a mounting protrusion extending from a side surface thereof. The storage device holder is disposed on the base and the mounting protrusion is fixed to the bracket by the screws. The storage device is fixed in the storage device holder. However, a developing trend to miniaturize the electronic device creates insufficient space to disassemble the storage device, rendering disassembly of the storage device troublesome, along with the risk of damaging other working elements of the electronic device during such process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
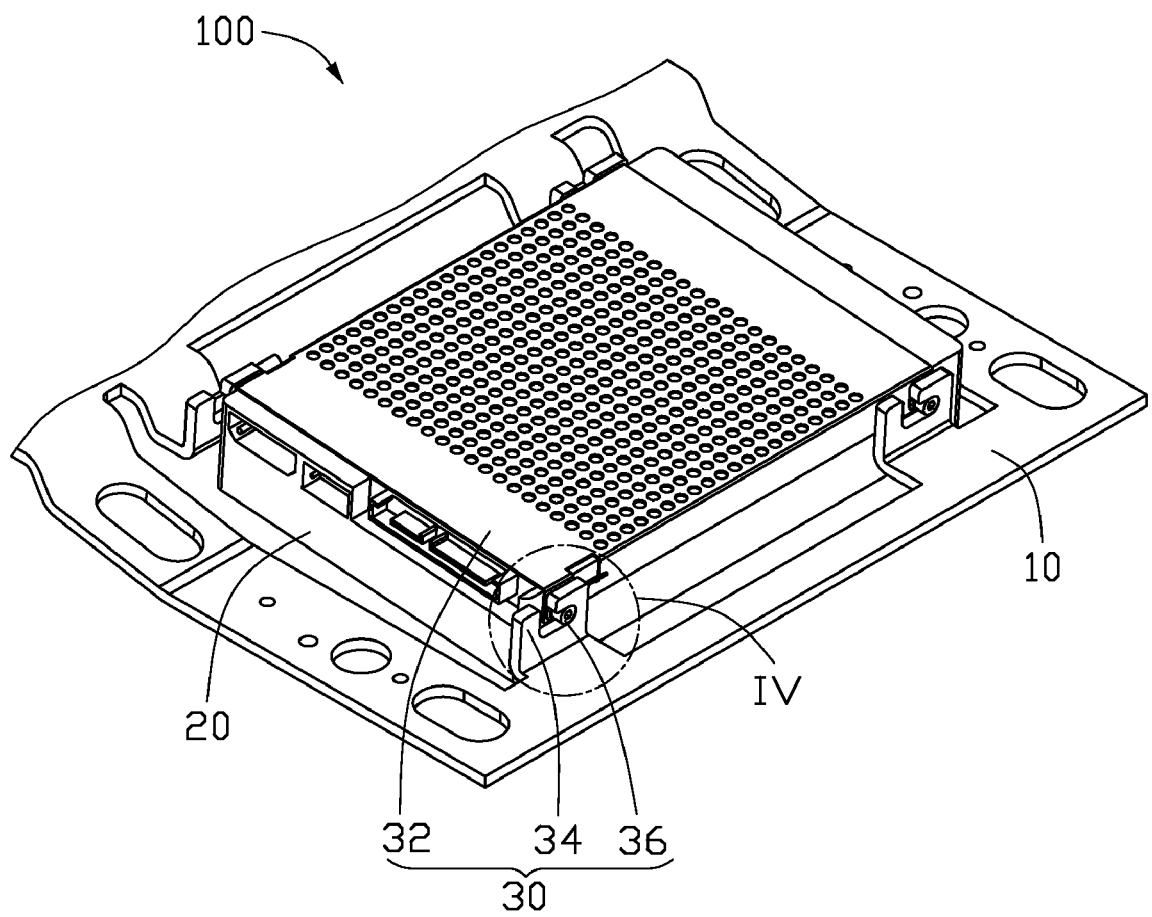
FIG. 1 is an isometric view of one embodiment of a fixing mechanism including a limiting member, two pairs of latching members, and two pairs of fixing members, shown in an embodiment of an electronic device.
Figure 2:
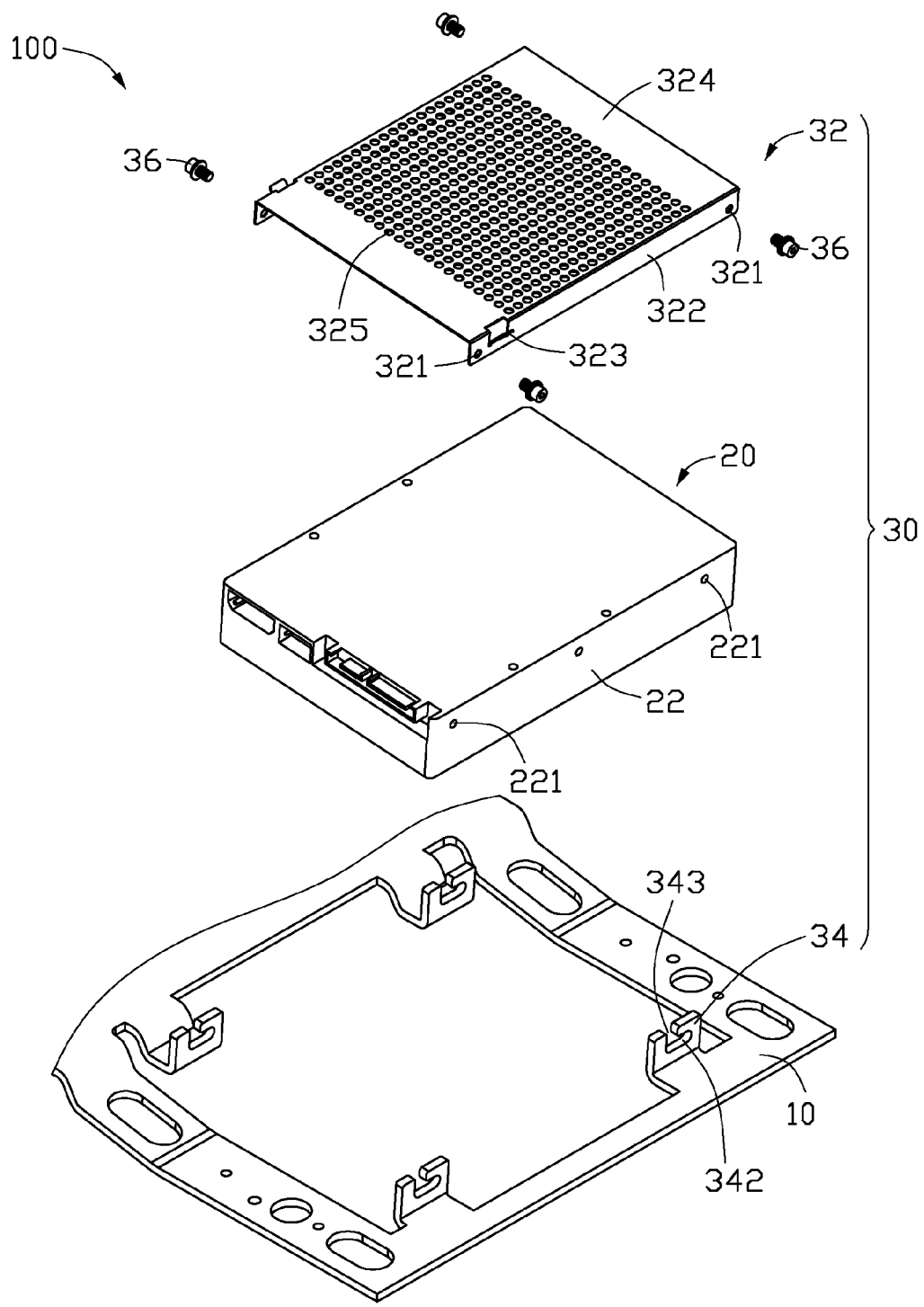
FIG. 2 is an exploded, isometric view of the fixing mechanism shown in FIG. 1.

Referring to FIGS. 1 and 2, an embodiment of an electronic device 100 includes a bracket 10, a storage device 20, and one embodiment of a fixing mechanism 30 to fix the storage device 20 to the bracket 10. In the illustrated embodiment, the electronic device 100 is a host computer, but can be any device employing a storage device 20 such as a television set, handheld game console, and so on.

In the illustrated embodiment, the storage device 20 is a hard-disk drive, substantially cubic, and includes two positioning sides 22 opposite to each other. Each of the positioning sides 22 defines a pair of fixing holes 221 opposite to each other.

The fixing mechanism 30 includes a limiting member 32, two pairs of latching members 34 extending upward from the bracket 10, and two pairs of fixing members 36 to fix the limiting member 32 to the storage device 20. The two pairs of the latching members 34 are opposite to each other.

The limiting member 32 is substantially U-shaped. The limiting member 32 includes a main board 324 and a pair of side plates 322 extending substantially perpendicularly from opposite edges of the main board 324. Each of the side plates 322 defines a pair of through holes 321 and a resilient limiting portion 323 adjacent to one of the through holes 321. The two pairs of fixing members 36 engage in the corresponding through holes 321. In the illustrated embodiment, each of the resilient limiting portions 323 is a resilient sheet extending from the corresponding side plate 322 and bent outward. The main board 324 can define a plurality of dissipating holes 325 to dissipate heat from the storage device 20.

Each of the latching members 34 includes a latching groove 342 defined in a middle portion of the latching member 34 and an opening 343 defined in a top edge of the latching member 34 communicating with the latching groove 342. The two pairs of fixing members 36 engage with the corresponding latching grooves 342 of the latching members 34.

Figure 3:
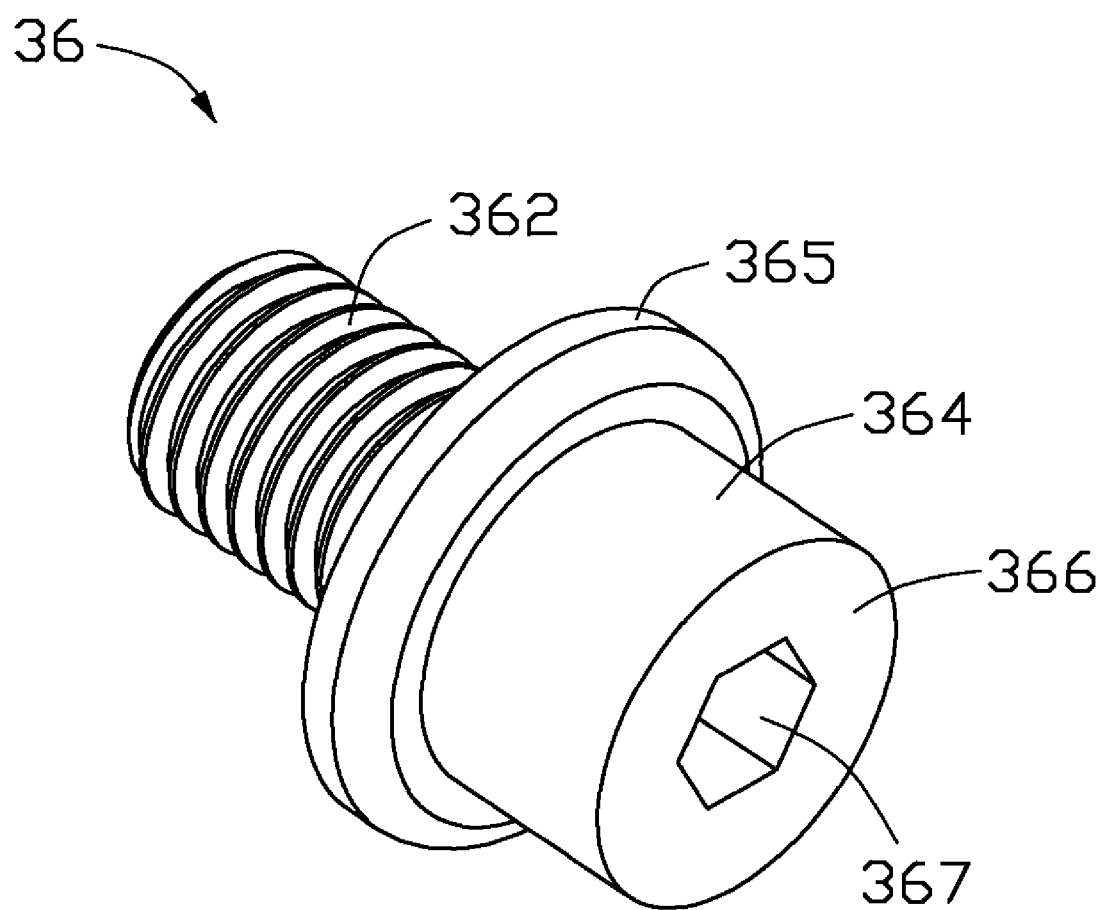
FIG. 3 is an enlarged, isometric view of one of the fixing members of the fixing mechanism shown in FIG. 1.

Referring to FIG. 3, each of the fixing members 36 can include a threaded portion 362, a head portion 364 extending from an end surface of the threaded portion 362, and a resisting portion 365 extending from a side of the head portion 364 adjacent to the threaded portion 362. The threaded portion 362 engages in a corresponding fixing hole 221 of the storage device 20. The head portion 364 engages in the corresponding latching groove 342 of the latching member 34. The head portion 364 can define a key 367 in an end surface 366 of the head portion 364 away from the resisting portion 365. In the illustrated embodiment, the key 367 is a hexagonal groove to aid in engaging the fixing members 36 in the fixing holes 221. The fixing members 36 can be, but are not limited to, screws. For example, the head portion 364 can be a head of a socket head cap screw, and the resisting portion 365 can be a washer.

Figure 4:
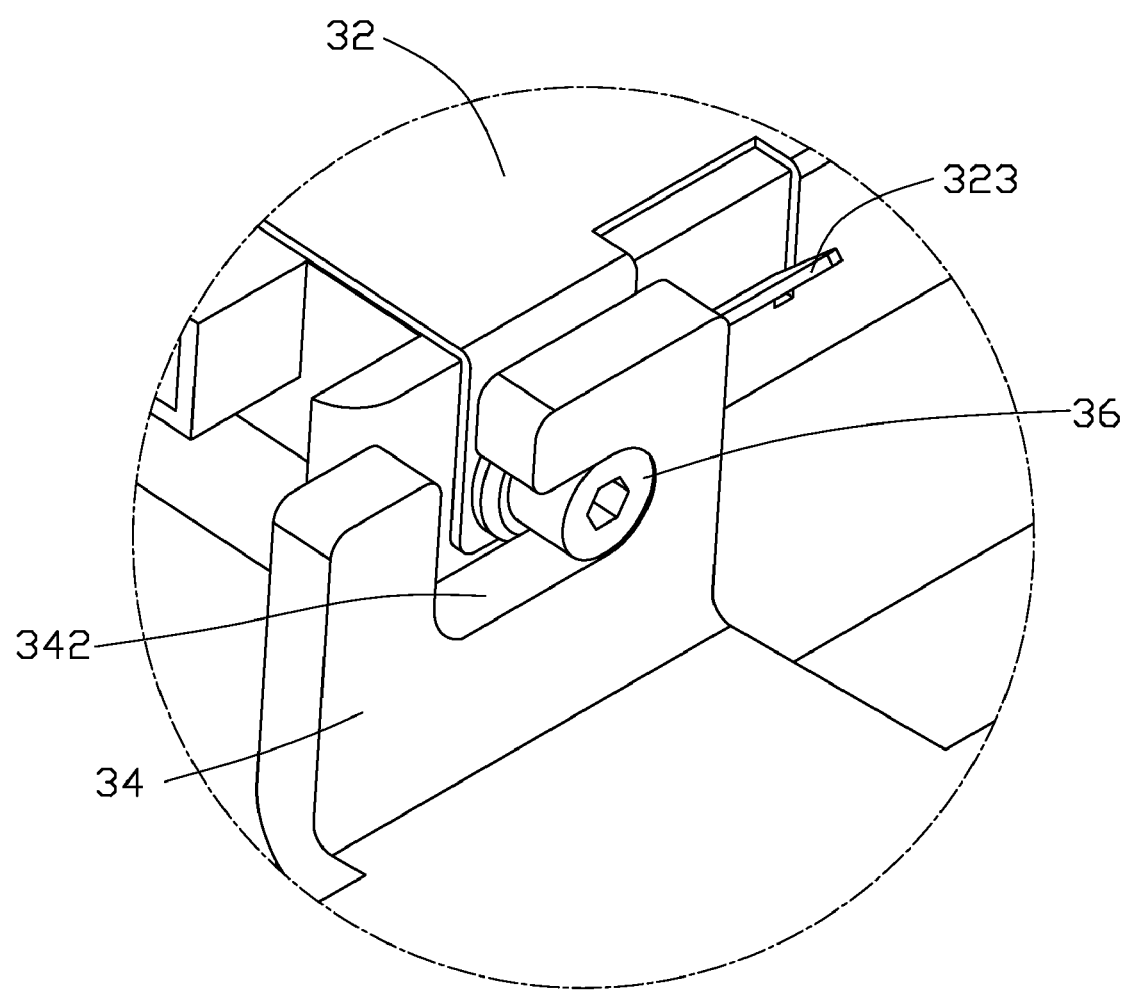
FIG. 4 is an enlarged view of circular part IV of the fixing mechanism shown in FIG. 1.

Referring to FIGS. 2 and 4, the storage device 20 is fixed to the bracket 10 as follows. The limiting member 32 is placed on the storage device 20. The threaded portions 362 of the fixing members 36 pass through the through holes 321 of the limiting members 32, and engage in the corresponding fixing holes 221 of the storage device 20, to fix the storage device 20 between the pair of side plates 322 of the limiting member 32. The storage device 20 with the limiting member 32 is received in a space between the two pairs of latching members 34 by fixing the head portion 364 of the fixing members 36 into the openings 343 of the corresponding latching members 34. At this instance, the limiting portions 323 are pressed towards the side plates 322 by the latching member 34. Finally, the two pairs of fixing members 36 are moved along the latching members 34, such that the two resilient limiting portions 323 elastically spring outward to resist the head portions 364 of the corresponding fixing members 36. The storage device 20 is fixed to the bracket 10.

The storage device 20 can be detached from the bracket 10 as follows. The two resilient limiting portions 323 of the limiting member 32 are pressed toward the side plates 322, such that the two resilient limiting portions 323 deform to allow the fixing members 36 to slide freely relative to the latching members 34. The two pairs of fixing members 36 slide relative to the latching members 34 until detached from the latching grooves 342. The storage device 20 with the limiting member 32 is disassembled from the bracket 10. Both assembly and disassembly of storage device 20 to the bracket 10 are simply and easily accomplished, and the structure of the fixing mechanism 30 is relatively simple.

It should be pointed out that the number of latching members 34 and fixing members 36 can be two, three, or more than four, and the number of resilient limiting portions 323 can be more than two.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fixing mechanism fixing a storage device to an electronic device, the electronic device comprising a bracket, the fixing mechanism comprising:
   two pairs of latching members extending upwardly from the bracket, each latching member of the two pair of latching members defining a substantially L-Shaped latching groove;
   a limiting member having a pair of resilient limiting portions; and
   two pairs of fixing members fixing the limiting member to the storage device, and engaging in the substantially L-Shaped latching grooves of corresponding latching members to fix the storage device and the limiting member to the bracket,
   wherein the resilient limiting portions resist a side of the corresponding latching members to secure the fixing members in the substantially L-Shaped latching grooves of the corresponding latching members; the storage device is detached from the bracket depending on the resilient deformation of the resilient limiting portions in a direction parallel to an axis of each the two pairs of fixing members.

2. The fixing mechanism of claim 1, wherein the limiting member further comprises a main board and a pair of side plates extending substantially perpendicularly from opposite edges of the main board, each of the pair of the resilient limiting portions fixedly disposed on each side plate of the pair of side plates; the storage device is fixed between the pair of side plates.

3. The fixing mechanism of claim 2, wherein each of the resilient limiting portions is a resilient sheet extending from the each side plate and bent outward.

4. The fixing mechanism of claim 2, wherein the main board defines a plurality of dissipating holes to dissipate heat from the storage device.

5. The fixing mechanism of claim 2, wherein each of the latching members of the two pairs of latching members further defines an opening in a top edge thereof communicating with the latching groove.

6. The fixing mechanism of claim 5, wherein each of the fixing members of the two pairs of fixing members comprises a threaded portion, a head portion extending from an end surface of the threaded portion, and a resisting portion extending from a side of the head portion adjacent to the threaded portion; the head portion slides freely in the latching groove; the storage device defines two pairs of fixing holes; and each threaded portion engages with a corresponding fixing hole of the two pairs of fixing members.

7. A fixing mechanism fixing a storage device to an electronic device, comprising:
   a bracket comprising two pairs of latching members extending upwardly from the bracket, each latching member of the two pairs of latching members defining a substantially L-Shaped latching groove;
   a limiting member having a pair of resilient limiting portions; and
   two pairs of fixing members fixing the limiting member to the storage device, and engaging in the substantially L-Shaped latching grooves of corresponding latching members of the two pairs of latching members to fix the storage device and the limiting member to the bracket,
   wherein each of the resilient limiting portions resist a side of the corresponding latching member to secure one of each of the two pairs of fixing members in the substantially L-Shaped latching grooves of the corresponding latching member; the storage device is detached from the bracket depending on the resilient deformation of the resilient limiting portions in a direction parallel to an axis of each the two pairs of fixing members.

8. The fixing mechanism of claim 7, wherein the limiting member further comprises a main board and a pair of side plates extending substantially perpendicularly from opposite edges of the main board, each of the pair of the resilient limiting portions fixedly disposed on each of the pair of side plates; the storage device is fixed between the pair of side plates.

9. The fixing mechanism of claim 8, wherein each of the resilient limiting portions is a resilient sheet extending from the each of the pair of side plates and bent outward.

10. The fixing mechanism of claim 8, wherein the main board defines a plurality of dissipating holes to dissipate heat from the storage device.

11. The fixing mechanism of claim 8, wherein each of the latching members of the two pairs of latching members further defines an opening in a top edge thereof communicating with the latching groove.

12. The fixing mechanism of claim 11, wherein each of the fixing members of the two pairs of fixing members comprises a threaded portion, a head portion extending from an end surface of the threaded portion, and a resisting portion extending from a side of the head portion adjacent to the threaded portion; the head portion slides freely in the latching groove; the storage device defines two pairs of fixing holes; and each threaded portion engages with a corresponding fixing hole of the two pairs of fixing holes.

13. An electronic device comprising: a bracket; a storage device;
   a fixing mechanism fixing the storage device to the electronic device, the fixing mechanism comprising two pairs of latching members extending upwardly from the bracket, each latching member of the two pairs of latching members defining a substantially L-Shaped latching groove, a limiting member having a pair of resilient limiting portions, and two pairs of fixing members fixing the limiting member to the storage device,
   wherein the two pairs of fixing members engage in the substantially L-Shaped latching grooves of corresponding latching members to fix the storage device and the limiting member to the bracket, the pair of resilient limiting portions resist a side of the corresponding latching members to secure the fixing members in the substantially L-Shaped latching grooves of the corresponding latching members along a direction parallel to the bracket; the storage device is detached from the bracket depending on the resilient deformation of the resilient limiting portions in a direction parallel to an axis of each the two pairs of fixing members.

14. The electronic device of claim 13, wherein the limiting member further comprises a main board and a pair of side plates extending substantially perpendicularly from opposite edges of the main board, each of the pair of the resilient limiting portions fixedly disposed on each of the pair of side plates; the storage device is fixed between the pair of side plates.

15. The electronic device of claim 14, wherein each of the resilient limiting portions is a resilient sheet extending from the each of the pair of side plates and bent outward.

16. The electronic device of claim 14, wherein the main board defines a plurality of dissipating holes to dissipate heat from the storage device.

17. The electronic device of claim 14, wherein each of the latching members of the two pairs of latching members further comprises an opening defined in a top edge thereof communicating with the latching groove.

18. The electronic device of claim 17, wherein each of the fixing members of the two pairs of fixing members comprises a threaded portion, a head portion extending from an end surface of the threaded portion, and a resisting portion extending from a side of the head portion adjacent to the threaded portion; the head portion slides freely in the latching groove; the storage device defines two pairs of fixing holes; and each threaded portion engages with a corresponding fixing hole of the two pairs of fixing holes.

* * * * *